Aug. 1, 1933.  C. C. GROTNES  1,920,303
METHOD OF AND MACHINE FOR MAKING WHEEL RIMS
Filed May 15, 1931    3 Sheets-Sheet 3
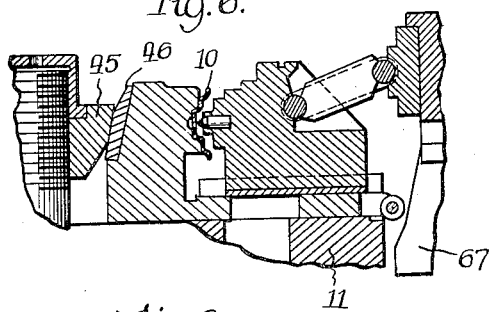
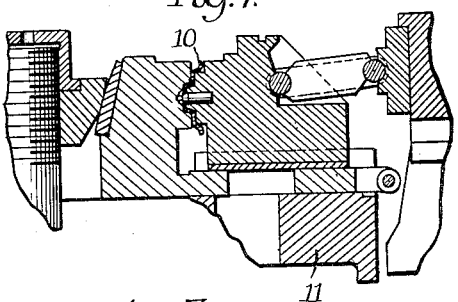
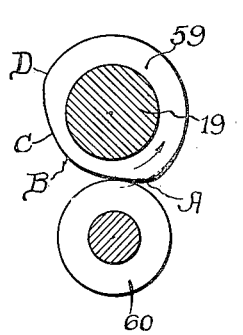
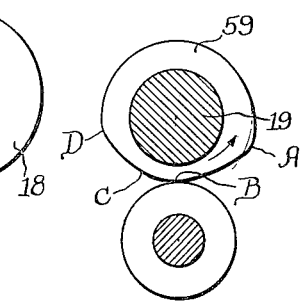
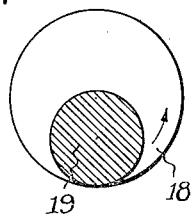
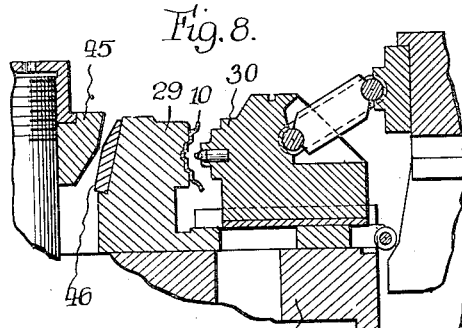
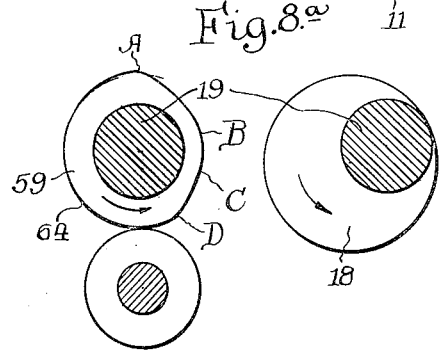
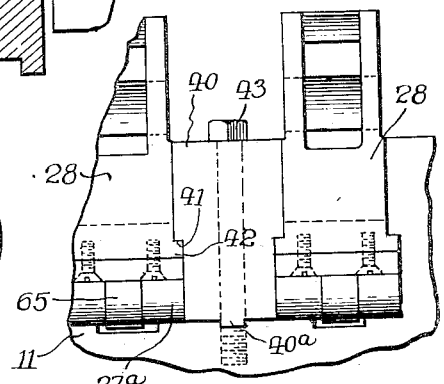
Inventor:
Carl C. Grotnes,
By Churchill Parker Carlson
Attys.

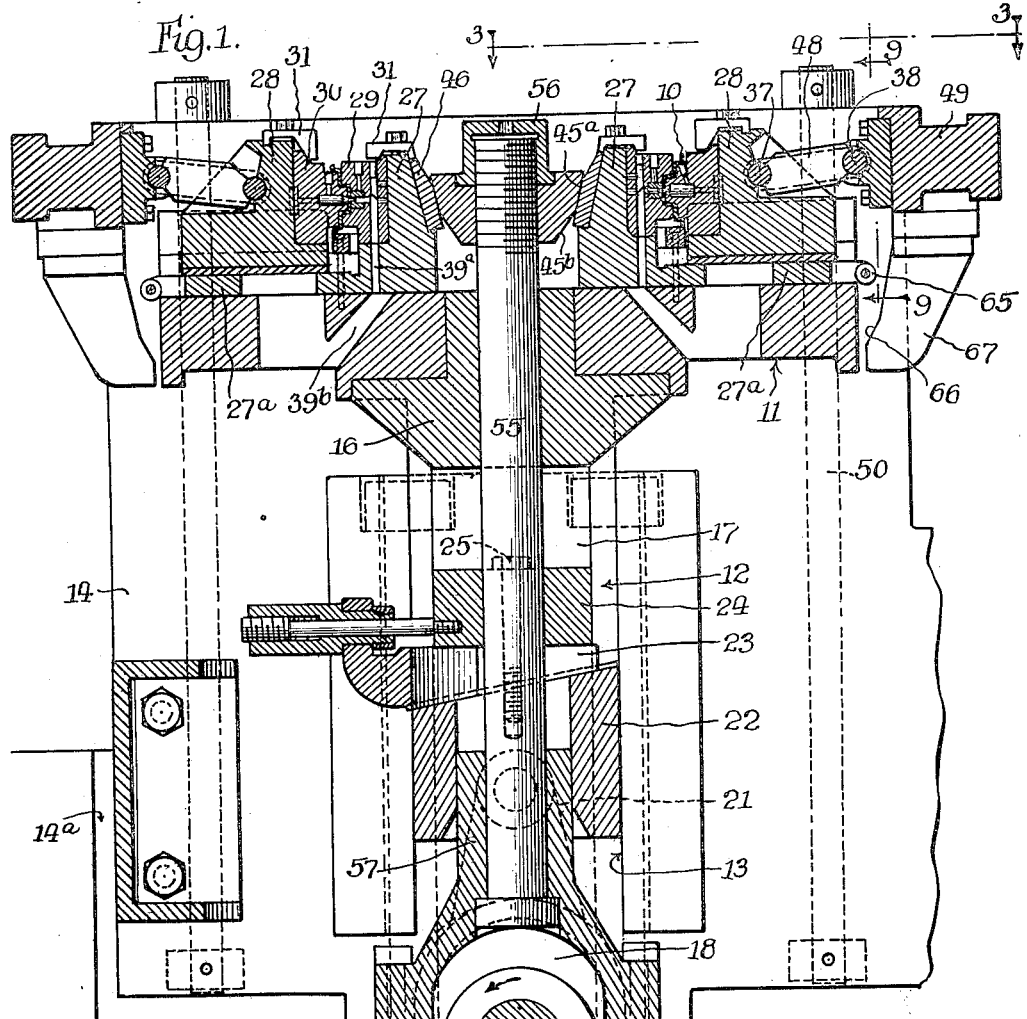

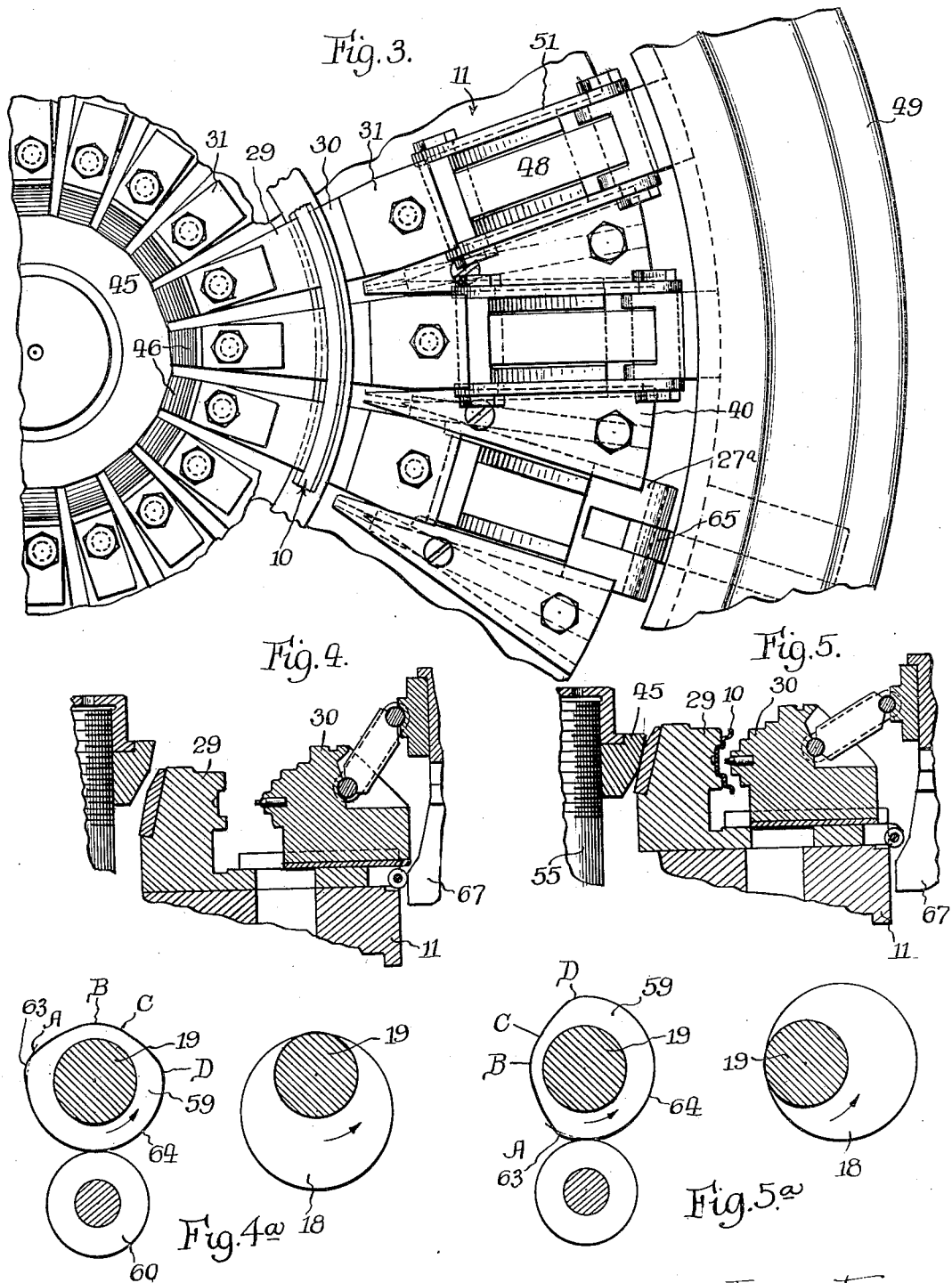

Patented Aug. 1, 1933

1,920,303

UNITED STATES PATENT OFFICE 1,920,303

METHOD OF AND MACHINE FOR MAKING WHEEL RIMS

Carl C. Grotnes, Park Ridge, Ill.

Application May 15, 1931. Serial No. 537,551

16 Claims. (Cl. 153—2.)

The invention relates generally to the manufacture of annular metallic articles, and it pertains more especially to the making of metallic rims for wire wheels.

An important object of the invention is to provide an improved method of forming rims for wire wheels whereby sockets with spoke holes at the bottoms thereof may be expeditiously and accurately formed in the rims.

Another object of the present invention is to provide an improved machine for forming such rims, said machine having opposed annular sets of die blocks movable toward and away from each other along true radial lines, and without lateral wobbling, together with rugged, powerful and accurately coordinated actuating means for the dies capable of operating the machine to produce accurately dimensioned work on a quantity production basis.

More specifically, it is the object of the invention to produce such a rugged machine wherein the amount of movement of the heavier parts is minimized so as to produce a high operating efficiency.

Another object of the invention is to provide a machine of this character wherein all of the forces exerted on the die blocks during the work performing operation tend to maintain the die blocks firmly and accurately in position upon their slideways.

In wire wheels of the type now in vogue the relatively deep grooving of the drop-center rim employed necessitates a wide range of movement in the radially movable dies used for operating thereon, while the small inner diameter of the rims limits the working space available within the rim for the actuating means of the inner dies. Another object is to provide a simple and practical machine of the character mentioned capable of utilizing powerful toggle actuators for the outer dies together with compact means disposed within the inner dies for imparting the requisite working movement thereto.

Another object is to provide such a machine embodying simple and positively acting means for retracting the inner dies.

A further object of the invention is to provide a new and improved mounting for the two sets of die blocks adapted in all sizes of machines to provide great strength in the blocks, long bearing surfaces, and lateral support for the blocks whereby to insure against wobbling or tipping of the blocks and prevent inaccuracy in the work and undue strain in the die blocks.

Another object is to provide a machine operable to punch spoke holes in rims, and in the same operation and from the same side of the rim, to form indentations in the rim about the spoke holes, the machine being arranged to form the finished spoke holes cylindrically or with the inner ends smaller, as desired, whereby to insure a maximum shearing area in the rim to resist inward displacement of the spoke heads.

Other objects and advantages will become apparent from the following description taken in connection with the accompanying drawings, in which:

Figure 1 is a vertical central sectional view taken through a preferred form of machine embodying the features of the invention.

Fig. 2 is an enlarged cross sectional view of the dies.

Fig. 3 is an enlarged fragmentary plan view of the machine as viewed from the line 3—3 of Fig. 1.

Fig. 4 is a fragmental diagrammatic view showing the relation of the dies and their actuating parts when the dies are in their separated or work receiving positions.

Fig. 4ᵃ is a diagrammatic view of the actuating cam and eccentric in positions corresponding to the position of the parts shown in Fig. 4.

Fig. 5 is a view similar to Fig. 4 showing the inner dies expanded to their chucking relation to the work and before the outer dies have engaged the work.

Fig. 5ᵃ is similar to Fig. 4ᵃ and shows the cam and eccentric positioned to correspond to the position of parts shown in Fig. 5.

Fig. 6 is a view similar to Figs. 4 and 5 showing the outer die in an advanced position wherein it contacts the work.

Fig. 6ᵃ is a view similar to Figs. 4ᵃ and 5ᵃ showing the parts in positions corresponding to the positions of the parts shown in Fig. 6.

Fig. 7 is a view showing the dies at the completion of the work performing operation.

Fig. 7ᵃ shows diagrammatically the actuating shaft with its cam and eccentric positioned to correspond with Fig. 7.

Fig. 8 shows the outer dies partially withdrawn by downward movement of the table, with the outer stationary cam about to act upon the extensions of the inner die blocks to retract the same.

Fig. 8ᵃ is a view similar to Fig. 7ᵃ showing the parts in positions corresponding to Fig. 8.

Fig. 9 is an enlarged fragmentary elevational view taken from the line 9—9 of Fig. 1, showing the mounting of the die blocks.

For purposes of disclosure the invention is illustrated in the drawings and will hereinafter be described in detail in connection with a machine having both indenting and punching means, but it is to be understood that the invention is not limited to this particular type of machine.

In the attainment of the above and other objects, the invention in the form illustrated provides a power operated machine having an axially movable table carrying two opposed annularly arranged sets of die blocks movable radially toward and away from each other, together with means operable in a uni-directional movement of the table first to expand the inner die blocks and then, while maintaining them in chucking relation to the work, to move the outer die blocks radially inwardly to shape the rim, punch spoke holes therein and form sockets in the rim about the holes. In the reversal of the table movement the die blocks are withdrawn to release the rim for removal from the machine.

The machine herein illustrated is adapted to operate upon a rim 10 while the rim is in horizontal position. To this end the machine comprises a horizontally disposed work support in the form of a table 11 (Figs. 1 and 3) mounted for vertical reciprocation on the upper end of a plunger-like slide 12, the latter being guided in a slideway 13 centrally located in a vertically elongated machine frame 14. The slide 12 has a flanged hub 16 at its upper end to which the table 11 is secured, and extending downwardly from opposite sides of the hub 16 is a pair of spaced bars 17 (only one shown) adapted to engage the slideway 13. The frame 14 may be mounted in a pit 14ª to position the table 11 at the desired height above the floor.

The table 11 is reciprocated to operate the forming and sizing means and perform the desired operations on the work. The means provided for this purpose comprises a pair of spaced eccentrics 18 (only one being shown) mounted on opposite sides of the axis of the slide 12 on a horizontal shaft 19 journaled in the lower portion of the frame 14. To operate the slide 12, the eccentrics 18 are connected by links 21 to a crosshead 22 slidably mounted between the bars 17 of the slide 12, and upward movement of the cross-head 22 is transmitted to the slide through the medium of a transversely adjustable wedge 23 interposed between the upper surface of the cross-head and a cross-bar 24 connecting the bars 17 of the slide. Return or downward movement of the slide 12 is obtained through the connection formed by one or more bolts 25 acting between the cross-bar 24 and the cross-head 22, and arranged when loosened to permit adjustment of the wedge 23.

The various sizing, shaping and punching operations on the rim 10, are performed through the operation of two opposed annularly arranged sets of radially movable die-carrying blocks 27 and 28. The blocks 27 constitute the inner or expanding set and in the present instance have outwardly extending base plates 27ª bearing on the upper surface of the table 11. The blocks 28, constitute the outer or contracting set, and herein slide upon the upper surfaces of the bases 27ª of the inner die blocks 27. The machine may be adapted for the performance of various operations by providing complemental dies 29 and 30 mounted in opposing relation on the die blocks 27 and 28 respectively by means of clamps 31.

In accordance with the present invention the shaping and sizing of the rims 10, the punching of the spoke holes 32 in the rim (Fig. 2), and the forming of the outwardly facing sockets 33 about the spoke holes 32 are all performed in the same operation of the machine. Preferably both the punching and socket-forming operations are performed by a contracting movement of the outer dies 30. Thus each of these dies is provided with one or more punches 34 (Fig. 2) each carried on the rounded outer ends 35 of studs 36 fixed in the dies 30. The rounded ends 35 constitute socket-forming elements which project beyond the faces of the dies for a distance sufficient to form the sockets 33 in the rim. In this action the studs press the metal of the rim into substantially complemental recesses 37 formed in bushings 38 fixed in the inner dies 29 in opposed relation to the punches. The bushings 38 are each provided with a relieved passage 39 to receive the punched slugs and the end of the punch 34. From the horizontal passages 39, the slugs are forced into vertical passages 39ª extending downwardly through the dies 29 and die blocks 27 and arranged to register at all times with angularly extending discharge passages 39ᵇ formed in the table 11.

As each of the punches is forced against the rim 10 it tends to shear a hole through the metal of the rim before the metal has been bent completely into the recess 37, with the result that the inner end of the hole 32 is enlarged as the socket 33 is completed. In order to produce a finished spoke hole 32 of cylindrical form, or with a reduced inner end, the recess 37 and the boss 35 are proportioned to compress the metal immediately adjacent to the hole 32 to a thickness less than the remainder of the rim (see Fig. 2) whereby to force the metal radially against the sides of the punch 34.

In the manufacture of wheel rims, extremely close limits of tolerance as to the spacing and size of the spoke holes are required, and it is therefore necessary that accurate guiding means by provided for the two sets of dies. The problem of securing such accurately guided movement of the dies is rendered difficult by the large number of dies which must be used when a large number of spoke holes are to be punched in the rim. Thus in the form shown herein, the machine is designed for punching 40 spoke holes in the rim, and 20 dies are used in each set, with means on each of the opposed dies 29 and 30 for punching two holes in the rim.

To provide effectual means for guiding the dies, I employ a construction whereby the guiding means for the inner die blocks 27 is located outside of the periphery of the rim 10 and acts upon the outwardly extending base plates 27ª of the inner die blocks; and the same guide means also serve to guide the outer die blocks 28. Thus, as shown in Fig. 3 of the drawings, the base plates 27ª of the inner die blocks are provided with parallel side edges of substantial length, which side edges are also parallel to the path of movement of the inner die blocks 27 on the table 11. Accordingly triangular spaces are provided between the side edges of the bases 27ª, and in such spaces are secured triangular guide members 40. The members 40 are undercut as at 41 (Fig. 9) so as to overlie outwardly projecting flanges 42 formed along the lower edges of the outer die blocks 28. Each guide member 40 has a tongue 40ª formed on its lower surface to engage a complemental radial groove formed in the upper surface of the table and the guide members are held in place by bolts 43 extending downwardly therethrough and engaging the table 11.

The side edges of the bases 27ª as well as the edges of the flanges 42 engage the adjacent guide members 40 so that the guide members serve to define the path of movement of both the inner and outer die blocks. The guide members 40 extend upwardly for a substantial distance above the flanges 42 and in engagement with the sides of the die blocks 28 whereby to prevent undesired lateral wobbling of the die blocks 28. Thus the punches 34 are maintained in alinement with the openings 39 in the inner dies and the spoke holes are formed of the desired diameter and in properly spaced relation to each other.

The outward chucking movement of the inner dies 29 is accomplished during the initial portion of the upward movement of the table 11 by coacting cams 45 and 46 as hereinafter described, and thereafter in the continued upward movement of the table, the inward movement of the outer dies 30 occurs so as to shape the rim 10 and perform the other operations thereon.

Such inward movement of the outer dies 30 is preferably obtained by toggles 48 one of which is interposed between each die block 28 and a stationary abutment formed by a ring 49 carried on the upper end of the frame 14. The ring 49 is in the present case formed separately from the frame 14 and is held in place by a plurality of tie rods 50 acting between the ring and the frame 14. As shown in Figs. 1 and 3 each toggle 35 bears at opposed ends against trunnions 37 and 38 mounted respectively on the block 28 and the ring 49 and the toggle is held in engagement with the trunnions by links 51 connecting the opposite ends of the trunnions. This construction effects movement of the die blocks 28 in both directions during reciprocation of the table 11 and it is capable of transmitting tremendous inward pressure to the dies 30.

In the work performing cycle of the machine the toggles 48 are moved from the angular downwardly extending position shown in Fig. 4 to a slightly less than horizontal position shown in Fig. 7, and the actual performance of the work by the outer dies takes place while the toggles are being moved from the position of Fig. 6 to that of Fig. 7. It will be noted the toggles 48 act at all times during the work performance operation to exert a downwardly directed force upon the die blocks 28 so as to maintain the same firmly in engagement with the upper surface of the bases 27ª. It follows therefore that the bases 27ª are held firmly against the table 11.

It will be clear however that before the outer dies 30 perform their work on the rim 10, the rim must be supported by the inner dies 29. This is accomplished by expanding the inner dies to a predetermined diameter, not only to chuck the rim, but to assist in properly sizing the same. This chucking movement of the inner dies 29 is obtained through the medium of the coacting cams 45 and 46 as above mentioned. The cam 45 is in the form of a generally cylindrical block or central abutment engaged at its outer side surfaces by the cams 46, one of which is attached to each of the inner die blocks 27. The cams 46 in the present case are held in place on the die blocks 27 by the clamps 31 which secure the dies 29 to the die blocks.

As shown in Fig. 3 of the drawings the periphery of the cam 45 is divided into a plurality of flat segments, one for each of the cams 46. These segments each slope gradually inwardly from the top of the cam 45 as indicated at 45ª (Fig. 1) and toward the lower end of the cam 45 the slope of the segments becomes more abrupt as at 45ᵇ. The cams 46 are provided with similar surfaces reversely disposed, that is sloping radially outwardly and upwardly and engageable with the surfaces 45ª and 45ᵇ of the cam 45.

Upon movement of the table 11 upwardly, the engagement of the cams 45 and 46 causes outward radial movement of the inner dies 29 until the rim is properly sized and is chucked thereon. Such outward movement of the inner dies does not require great force, so that the cam means is well adapted to accomplish this result. At the same time, the cam means possesses the distinct advantage that it requires very little space and is therefore adapted to be used in this small space available in rims of small diameter.

After the chucking of the rim, thus effected in the initial upward movement of the table, the sizing and shaping operations are performed by the outer dies 30. In this operation the outer dies must act simultaneously about the entire periphery of the rim and the toggles 48 are required to exert great inward force upon dies 29 to perform the rim shaping, punching and socket-forming operations. Accordingly, after the chucking operation, occuring in the initial portion of the upward movement of the table, relative movement between the coacting cam surfaces is prevented by permitting the cam block 45 to move with the table.

In order thus to control the cam 45, a suitable connection is provided between it and the main drive shaft 19. This connection comprises a rod 55 (Fig. 1) secured to the cam 45 by a nut 56 and extending downwardly through and beyond the table 11. At its lower end the rod 55 is fixed to a slide 57 guided for movement in the cross-head 22 and forming part of a yoke 58 which surrounds a cam disk 59 mounted on the shaft 19 between the two eccentrics 18. A follower roller 60 mounted on the yoke 58 engages the lower edge of the cam 59 to determine the extent of the upward movement of the rod 55 and its cam 45. The roller 60 is held in engagement with the cam disk 59 by springs 61 acting between the yoke 58 and a stationary part 62 of the frame 14. Such springs are of sufficient strength to sustain the weight of the cam block and associated parts, so that the position of the cam block may be at all times under the control of the cam.

In the case of rims with deep drop centers, requiring a large radial movement practical limitations in the slopes which may be used on the cams 45 and 46 and in the permissible angles of the toggles prevent proper chucking movement of the inner dies solely by upward movement of the table along the cam 45. Accordingly the present embodiment of the invention provides, on the cam disk 59, a lobe 63 (see Fig. 4) which during the upward movement imparted to the table by the eccentrics 18, draws the cam 45 downwardly. In this way, the inner dies 29 are insured the requisite expanding movement before the punches 34 are brought into contact with the work.

The operation of the machine will be best understood from a consideration of Figs. 4 to 8 inclusive which are of a schematic character and show the positions of the various parts at different critical points in the operating cycle.

As shown in Fig. 4 of the drawings, the table 11 is in its lowermost position with both the inner and outer dies retracted and ready for placing of the rim 10 therebetween. As the parts move between the positions shown in Figs. 4 and 5, the central cam 45 is held stationary by a dwell surface 64 on the cam disk 59 while upward movement of the table 11 engages the abrupt surface of the cams 45 and 46 to rapidly expand the inner dies 29. After the gradually sloping surfaces 45$^a$ of the cams 45 and 46 have been brought into engagement, the projecting lobe 63 of the cam 59 engages the roller 60 (Fig. 5) and draws the central cam 45 downwardly to impart a final expanding movement to the inner dies 29. This action brings the rim 10 to the proper size before it is engaged by the punches 34, the latter, during the upward movement of the table having been brought into proximity to the rim 10 by the action of the toggles 48, as will be seen in Figs. 5 and 6 of the drawings.

As above pointed out, great force is exerted inwardly on the rim 10 and the inner dies 29 during the performance of work upon the rim by the outer dies 30, that is while the parts are being moved from the positions shown in Fig. 6 to the positions shown in Fig. 7 of the drawings. The cam disk 59 is therefore provided with a relieved or receding surface extending from the point A to the point B (Fig. 6) so as to permit upward movement of the cam with the table and thereby avoid all relative movement between the cams 45 and 46. Said surface A—B of the cam disk 59 is proportioned so that such upward movement of the cam 45 corresponds to but cannot exceed at any time the upward movement of the table 11 whereby to maintain the inner dies 29 at the same diameter during the entire operation.

It will be observed that the cam surfaces 45$^a$ of the cam 45 face inwardly and downwardly toward the surface of the table 11, so that the inward force exerted by the outer dies tends to hold the inner dies firmly against the upper surface of the table. Since this action is dependent upon the cam 45 and the table being maintained in the same relation, it will be seen that the proportioning of the cam surface A—B cooperates in producing this result.

When the parts have reached the positions shown in Fig. 7 of the drawings, the operation is finished, the rim 10 is properly shaped and sized and the holes 32 and sockets 33 are in the form shown in Fig. 2 of the drawings. In this connection it will be observed that in the final portion of the operation, during which the sockets 33 are formed, the toggles 35 are approaching their horizontal positions. Thus the great pressure required to shape the holes 32 about the punches 34, is provided for when the force which the toggles are capable of creating is at its maximum.

The table movement is now reversed by the operation of the eccentrics 18, but because of the shape of the dwell surface B—C of the cam 59 and the upward force exerted by the springs 61, downward movement of the cam block 45 is delayed to insure downward movement of the table and retraction of the outer dies before the cam block is lowered (see Fig. 8). Finally both the table and the cam block are lowered into the position shown in Fig. 4, in which movement the finished rim is completely released for removal and replacement. Lowering movement of the cam block 45 is caused by a leading surface C—D on the cam disk 59.

In view of the peculiar method being employed of shaping the sockets 33 about the punches 34 while in the inner dies, the latter have a tendency to adhere to the rim. I have therefore provided means for imparting a positive releasing movement to the inner jaws. This means preferably utilizes the downward movement of the table 11 and is located outside of the outer die blocks 28. Thus, as shown in Figs. 1 and 3, the outer end of each base plate 27$^a$ is bifurcated and a horizontal roller 65 is journaled therein so that during the final portion of the downward movement of the table, the rollers 65 will come into contact with cam surfaces 66 formed on the inner faces of downwardly projecting arms 67 carried on the ring 49. Thus in the movement of the table 11 from the position shown in Fig. 8 to the position shown in Fig. 4, the inner dies 29 are positively actuated to their innermost positions so as to release the finished work.

I claim as my invention:

1. A rim forming machine comprising, in combination, a vertically reciprocable table, a set of inner dies and a set of outer dies mounted on the table for radial movement and adapted to receive between them a rim to be formed, a plunger extending axially through said table and having cam surfaces thereon, said inner dies also having cam surfaces for engagement with said plunger, a stationary frame encircling the table, the latter being offset downwardly in the initial relation of the parts, a rotatable shaft having a cam thereon operatively associated with the plunger, means operable in the rotation of the shaft to move said table upwardly toward said frame whereby to produce a cam action between said plunger and the inner dies for imparting an outward work-chucking movement to the inner dies, toggle bars interposed between said frame and the outer dies and operable by the upward movement of the table to impart an inward movement to the outer dies, and positively acting means operating in the downward movement of the table to return the inner dies to their initial positions.

2. A rim forming machine comprising, in combination, a vertically movable table, opposed annularly arranged sets of inner and outer dies mounted for radial movement on the table and adapted to receive between them a rim to be formed, a plunger extending axially through said table, said plunger member and said inner dies having oppositely arranged opposed cam surfaces thereon comprising abrupt surfaces engageable during the initial upward movement of the table to rapidly expand the inner dies and also having gradually sloping surfaces engageable during subsequent relative movement of the table and plunger, a stationary frame encircling said table, toggles interposed between the frame and the outer dies operable to reciprocate said outer dies and to impart inward movement thereto as the table is raised; a rotatable shaft operatively connected to said table for raising and lowering the same, and a cam on said shaft operatively associated with said plunger, said cam acting first to hold said plunger stationary during the initial upward movement of the table while said abrupt cam surfaces are engaged, then to move said plunger downwardly after said gradually sloping cam surfaces are engaged, and finally to permit upward movement of the plunger with the table after said downward movement of the plunger has been completed, said table operating means being arranged to move said table downwardly upon completion of the shaping operation, and said cam being arranged during the downward table movement to return the plunger to its initial position, and means operable during downward movement of the table to retract said inner dies.

3. A rim forming machine comprising, in combination, a vertically reciprocable table, opposed annularly arranged sets of inner and outer dies mounted for radial movement on the table and adapted to receive between them a rim to be formed, a plunger extending axially through said table, said plunger member and said inner dies having oppositely arranged opposed cam surfaces thereon comprising abrupt surfaces and gradually sloping surfaces engageable successively during relative movement of the table and plunger, a stationary frame encircling said table, toggles interposed between the frame and the outer dies, means for reciprocating said table, a cam associated with said means and with said plunger and adapted to hold said plunger stationary during the initial upward movement of the table while said abrupt cam surfaces are engaged, and to move said plunger downwardly after said gradually sloping cam surfaces are engaged, to permit upward movement of the plunger with the table after said downward movement of the plunger has been completed, and during the downward table movement to return the plunger to its initial position, and cam means operable to retract said inner dies.

4. A rim forming machine comprising, in combination, a table mounted for up and down movement, opposed annularly arranged sets of inner and outer dies mounted on said table for radial movement and adapted to receive between them a rim to be formed, means for raising and lowering the table, a plunger disposed axially of the table, a cam on said plunger having cam surfaces thereon adapted in relative movement of the table upwardly along the plunger to expand said inner dies, a stationary frame encircling said outer dies, toggles interposed between said frame and said outer dies operable to reciprocate said outer dies and in upward movement of the table to impart inward movement thereto, and means operable during one portion of the upward movement of the table to hold the cam stationary, during another portion to move the cam downwardly, and during another portion to permit movement of the cam upwardly with the table.

5. A machine of the character described comprising, in combination, a table mounted for axial movement, opposed annularly arranged sets of inner and outer die blocks mounted on said table for radial movement toward and away from each other, a stationary frame surrounding said table, toggles interposed between the frame and said outer die blocks operable to move said outer dies inwardly in upward movement of the table, a plunger disposed centrally of the inner dies, a cam member on said plunger having cam surfaces facing outwardly and downwardly with respect to the plunger axis and engaging said inner die blocks to expand the same during movement of the table upwardly with relation to the plunger, means to maintain said plunger in fixed position during the first portion of the upward movement of the table, and thereafter during continued upward movement of the table to limit movement of the plunger to correspond to the table movement, and thereby maintain said outwardly and downwardly facing cam surfaces in the same relation to the inner die blocks.

6. In a rim forming machine having a set of inner dies and a set of outer dies, a horizontally disposed table providing an annular support for both sets of dies and mounted for vertical reciprocation, an inner central abutment, an outer encircling abutment, cam means operable between said inner abutment and the inner dies, toggle means operable between the outer abutment and the outer dies, and actuating means operable to move said table vertically, said cam means being operable in the initial portion of such vertical movement of the table to move the inner dies outwardly and said toggle means being operable in the latter portion of such vertical movement to move the outer dies inwardly, said actuating means comprising a shaft having an eccentric thereon connected with said table to move it in opposite directions and a cam on the shaft having a follower connected with the abutment to control the position of the latter, and spring means acting on the follower and coacting with said cam to delay the downward movement of said central abutment while an initial downward movement is imparted by said eccentric to the table.

7. In a machine of the character described the combination of a table, annularly arranged sets of inner and outer die blocks mounted in opposed relation on said table for radial movement toward and away from each other, a part on each inner die block extending radially outwardly beyond the outer die blocks, means for reciprocating said outer die blocks, means in the central space between said inner die blocks for causing outward radial movement thereof, and cam means outside of said outer die blocks engageable with the radial parts of the inner die blocks to impart inward radial movement thereto.

8. A machine of the character described comprising, a frame, a table movable axially therein, annularly arranged sets of inner and outer die blocks mounted in opposed relation for radial movement on said table, means operable in reciprocation of the table to reciprocate said outer die blocks, cam means within said inner set of die blocks operable in movement of the table in one direction to expand said inner set of die blocks, and cam means mounted on said frame radially outwardly of said outer die blocks and operable in movement of the table in the other direction to move said inner die blocks radially inwardly.

9. A machine of the character described having a table, an annularly arranged set of radially movable inner die blocks slidable on said table, said inner die blocks being of L-shaped form providing upstanding abutments at their inner ends and bases resting slidably on the table and projecting radially outwardly from said abutments, an annularly arranged set of outer die blocks one slidably positioned on the upper surface of each of said bases, and means fixed to said table and engaging both of the sets of die blocks to hold the same against lateral movement and guide them radially, and also engaging said outer die blocks to hold both sets of blocks against vertical displacement.

10. A machine of the character described having a table, an annularly arranged set of radially movable inner die blocks slidable on said table, said inner die blocks being of L-shaped form providing upstanding abutments at their inner ends and bases resting slidably on the table and projecting radially outwardly from said abutments, an annularly arranged set of outer die blocks one slidably positioned on the upper surface of each of said bases, and tapered guide blocks fixed on said table between said outer die blocks and between the outer ends of the bases of said inner die blocks and engaging said outer die blocks at a substantial distance from said table to guide the die blocks and prevent transverse wobbling thereof.

11. A rim forming machine having, in combination, an annular support, an annular set of inner die blocks each having an elongated radially extending base plate with parallel side edges, an annular set of outer die blocks slidable on the base plates of the inner die blocks and also having parallel side edges, and a plurality of triangularly shaped guide blocks secured to the support and providing guiding surfaces coacting with the opposite edges of both the inner and outer die blocks.

12. A machine of the character described comprising annularly arranged sets of opposed inner and outer dies mounted for radial movement toward and away from each other, and punches projecting inwardly from said outer dies at a plurality of points spaced about said set of dies for forming spoke holes in rims and also having bosses about said punches for forming sockets in the rim about the spoke holes, said inner dies having complemental openings therein to receive the ends of said punches and to cooperate therewith in piercing the rim and also having socket-like recesses about the outer ends of said openings into which the punches and bosses may bend the metal of the rim during the punching operation to form sockets about the spoke holes.

13. A machine of the character described comprising annularly arranged sets of inner and outer die blocks, movable radially toward and away from each other, dies on the outer blocks having punches thereon to form holes in a rim and also having bosses thereon about the punches for forming sockets in the rim about the holes, and opposed dies on the inner blocks having holes therein to receive the ends of the punches, and said inner dies also having recesses therein generally complemental to the bosses on said outer dies but of less depth radially of the rim than the radial projection of said bosses.

14. A machine of the character described comprising annularly arranged sets of inner and outer die blocks, movable radially toward and away from each other, dies on the outer blocks having punches projecting inwardly therefrom for forming spoke holes in rims, dies on said inner die blocks having bushings set therein to receive said punches, said bushings having socket-like recesses formed therein about their punch-receiving openings into which recesses the punches may force the metal during the punching operation, and means cooperating with the recessed ends of said bushings after the spoke holes have been formed to compress the metal of the rim and force the same into contact with the sides of the punches.

15. A machine for making wire wheel rims comprising an annular support, a set of annularly arranged inner die blocks, a set of annularly arranged outer die blocks, rim shaping dies on said blocks having co-axially arranged socket-forming elements and cylindrical hole-forming elements, and means for actuating said dies, said hole-forming elements being operable in advance of the socket forming elements, and the latter being operable in the final portion of the operation of said actuating means to compress the metal of the rim about the cylindrical hole forming elements so as to reduce the holes to true cylindrical form.

16. The method of forming sockets in wire wheel rims, with spoke holes in the bottoms of said sockets, which consists in perforating the rim to form each hole by means of a cylindrical perforating element, then shaping the portion of the rim about the hole to form the socket, and finally compressing the metal of the socket about the punch to reduce the hole to true cylindrical form.

CARL C. GROTNES.